United States Patent
Cinpinski et al.

(10) Patent No.: US 7,908,913 B2
(45) Date of Patent: Mar. 22, 2011

(54) SOLENOID DIAGNOSTIC SYSTEMS FOR CYLINDER DEACTIVATION CONTROL

(75) Inventors: Kenneth J. Cinpinski, Ray, MI (US); Joseph R. Dulzo, Novi, MI (US)

(73) Assignee: GM Global Technology Operations LLC

( * ) Notice: Subject to any disclaimer, the term of this patent is extended or adjusted under 35 U.S.C. 154(b) by 176 days.

(21) Appl. No.: 12/338,017

(22) Filed: Dec. 18, 2008

(65) Prior Publication Data

US 2010/0154526 A1 Jun. 24, 2010

(51) Int. Cl.
*G01M 15/04* (2006.01)
(52) U.S. Cl. .................................................. 73/114.79
(58) Field of Classification Search ............... 73/114.79
See application file for complete search history.

(56) References Cited

U.S. PATENT DOCUMENTS

| | | | |
|---|---|---|---|
| 5,537,961 A * | 7/1996 | Shigeru et al. | 123/90.15 |
| 6,196,174 B1 * | 3/2001 | Wada et al. | 123/90.15 |
| 6,885,976 B2 * | 4/2005 | Yoshiki et al. | 702/185 |
| 7,063,057 B1 * | 6/2006 | Waters et al. | 123/90.16 |
| 7,077,082 B2 * | 7/2006 | Bloms et al. | 123/90.12 |
| 7,228,828 B2 * | 6/2007 | Kagy et al. | 123/90.15 |
| 7,246,583 B2 * | 7/2007 | Cinpinski et al. | 123/90.27 |
| 7,343,887 B2 * | 3/2008 | Soejima | 123/90.15 |
| 7,698,935 B2 * | 4/2010 | Dibble et al. | 73/114.79 |
| 2003/0213445 A1 * | 11/2003 | Bloms et al. | 123/90.12 |
| 2007/0068474 A1 * | 3/2007 | Cinpinski et al. | 123/90.17 |
| 2007/0101959 A1 * | 5/2007 | Soejima | 123/90.17 |
| 2009/0222196 A1 * | 9/2009 | Cinpinski et al. | 701/105 |

* cited by examiner

*Primary Examiner* — Freddie Kirkland, III

(57) ABSTRACT

A solenoid diagnostic system includes a pressure monitoring module that determines a first pressure in an intake cam phaser for an intake camshaft and a second pressure in an exhaust cam phaser for an exhaust camshaft associated with a cylinder. A fuel injection monitoring module determines a fuel injection status associated with the cylinder. A fault determination module diagnoses a fault in a solenoid associated with the cylinder based on the first pressure, the second pressure, and the fuel injection status.

22 Claims, 3 Drawing Sheets

SOLENOID DIAGNOSTIC SYSTEMS FOR CYLINDER DEACTIVATION CONTROL

FIELD

The present invention relates to valvetrains of internal combustion engines, and more particularly, to diagnosing solenoids for cylinder deactivation control.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Variable displacement engines provide improved fuel economy and torque on demand using cylinder deactivation. When high output torque is required, all cylinders of a variable displacement engine are supplied with fuel and air. At low engine speeds, low load, and/or other inefficient conditions, some of the cylinders (for example only, half of the cylinders) may be deactivated to reduce throttle losses and improve fuel economy. Throttling losses, also known as pumping losses, are associated with work that an engine performs to pump air from the relatively low pressure of an intake manifold, across intake and exhaust valves, and out to the atmosphere. The deactivated cylinders prevent airflow across their respective intake and exhaust valves, thereby reducing pumping losses.

Valve lifters are used to open and close the intake and exhaust valves. When cylinder deactivation is desired, a solenoid that communicates with the valve lifters may be activated to allow pressurized oil to flow to ports in the valve lifters. The pressurized oil unlatches locking pins in the ports, thereby making the valve lifters collapsible. As such, rotational movement of cam lobes on the camshafts cannot be translated into translational movement of the intake and exhaust valves via the valve lifters. When the cylinder is deactivated, the intake and exhaust valves associated with the cylinder are closed.

SUMMARY

A solenoid diagnostic system includes a pressure monitoring module that determines a first pressure in an intake cam phaser for an intake camshaft and a second pressure in an exhaust cam phaser for an exhaust camshaft associated with a cylinder. A fuel injection monitoring module determines a fuel injection status associated with the cylinder. A fault determination module diagnoses a fault in a solenoid associated with the cylinder based on the first pressure, the second pressure, and the fuel injection status.

Further areas of applicability of the present disclosure will become apparent from the detailed description provided hereinafter. It should be understood that the detailed description and specific examples are intended for purposes of illustration only and are not intended to limit the scope of the disclosure.

DRAWINGS

DESCRIPTION

Figure 1:
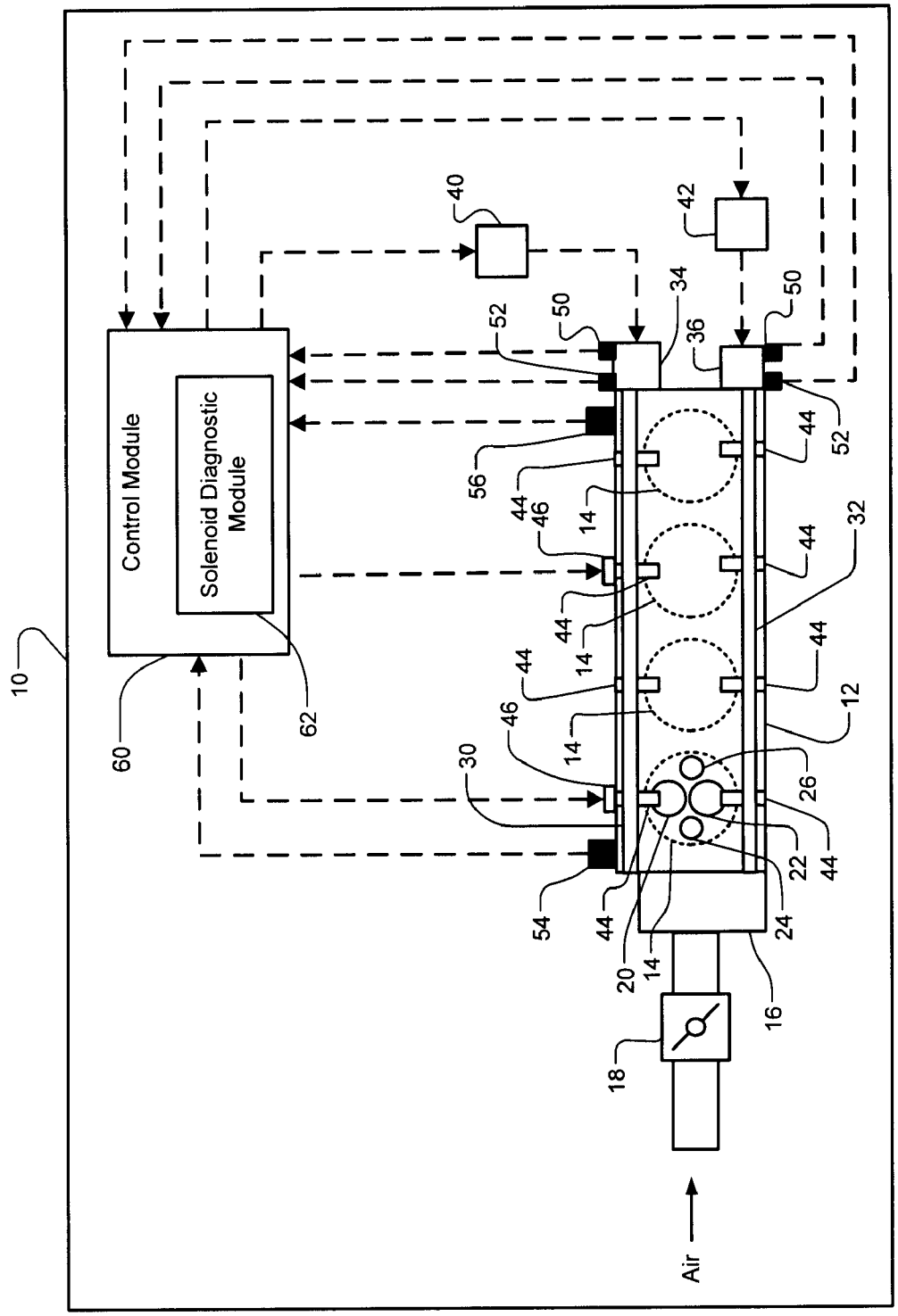
FIG. 1 is a schematic diagram of an engine system that includes a solenoid diagnostic system according to the teachings of the present disclosure.

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring to FIG. 1, an engine system 10 includes an overhead valve (OHV) internal combustion engine 12. The engine 12 includes multiple cylinders 14. While four cylinders 14 are illustrated, the engine 12 may include any number of cylinders, such as, for example only, 6, 8, 10 or 12 cylinders. Moreover, while the cylinders 14 are illustrated to form a straight (i.e., inline) engine, the cylinders 14 can be arranged to form a V-engine with two engine heads. The engine 12 can be any type other than OHV engine.

Air is drawn into an intake manifold 16 through a throttle 18. The throttle 18 regulates mass air flow into the intake manifold 16. Air within the intake manifold is distributed into the cylinders 14. Each cylinder 14 includes an intake valve 20, an exhaust valve 22, a fuel injector 24, and a spark plug 26. For the sake of clarity, only one intake valve 20, exhaust valve 22, fuel injector 24, and spark plug 26 are illustrated.

The fuel injector 24 injects fuel that is combined with the air as the air is drawn into the cylinder 14 through an intake port. The fuel injector 24 is controlled to provide a desired air-to-fuel (A/F) ratio within each cylinder 14. The intake valves 20 are sequentially opened and closed to enable a desired amount of air/fuel mixture to enter the cylinder 14. A piston (not shown) compresses the air/fuel mixture within the cylinder 14. The spark plug 26 initiates combustion of the air/fuel mixture, driving the piston in the cylinder 14. The piston drives a crankshaft (not shown) to produce drive torque. Combustion exhaust within the cylinder 14 is forced out an exhaust port when the exhaust valve 22 is opened. The exhaust is treated in an exhaust system (not shown) and released to the atmosphere.

Timing for opening and closing the intake and exhaust valves 20 and 22 is controlled by the intake and exhaust camshafts 30 and 32 that are synchronized to a crankshaft (not shown) by a chain or belt. The camshafts 30 and 32 generally include cam lobes (not shown) associated with the plurality of intake and exhaust valves 20 and 22. The cam lobes may be designed to have a first profile for a low lift and a second profile for a high lift. The intake valves 20 and the exhaust valves 22 are opened and closed as an intake camshaft 30 and an exhaust camshaft 32 rotate.

Alternatively, the intake valves 20 and the exhaust valves 22 may be controlled by a single camshaft assembly that includes an outer camshaft and an inner camshaft received therein. Each camshaft includes cam lobes. One of the inner and outer camshafts controls the intake valves, whereas the other of the inner and outer camshafts controls the exhaust valves. A pair of cam phasers may be provided to independently control the rotational position of the inner and outer camshafts and are mounted back to back.

It is noted that in a V-engine that includes two engine heads, one intake camshaft and one exhaust camshaft are provided for each engine head.

An intake cam phaser 34 is attached to an end of the intake camshaft 30. An exhaust cam phaser 36 is attached to an end of the exhaust camshaft 32. The intake cam phaser 34 and the exhaust cam phaser 36 regulate timing of the camshafts 30 and 32 relative to the crankshaft. More specifically, the timing or phase angle of the camshafts 30 and 32 can be retarded or advanced with respect to a location of the piston within the cylinder 14 or with respect to crankshaft position. When the cam phasers 34 and 36 are actuated, the camshafts 30 and 32 are rotated around their respective cam axis to change the rotational position of the camshafts 30 and 32 relative to the position of the pistons or the crankshaft position. Therefore, the timing of air/fuel mixture ingested into the cylinder 14, and therefore the engine torque, is regulated. The cam phasers 34 and 36 are hydraulically actuated by pressurized engine oil through a first oil control valve (OCV) 40 and a second OCV 42.

The intake and exhaust valves 20 and 22 are connected to the intake and exhaust camshafts 30 and 32, respectively, by a plurality of valve lifters 44. Each intake or exhaust valve 20 or 22 is connected to one of the valve lifters 44. The valve lifters 44 lift the intake valves 20 and the exhaust valves 22 as the intake and exhaust camshafts 30 and 32 rotate. During normal operations, the intake and exhaust camshafts 34 and 36 pivot the valve lifters 44 by the cam lobes as the intake and exhaust camshafts 30 and 32 rotate. The pivoting of the valve lifters 44 causes the intake valves 20 and the exhaust valves 22 to move to open and close the intake and exhaust ports.

The valve lifters 44 for the cylinders 14 may be operated in a normal operating mode and a telescoping mode. The valve lifters 44 may each include a port (not shown) and a locking pin (not shown) in the port. A solenoid 46 is provided for each cylinder 24 that can be deactivated. When the solenoids 46 are activated, the pressurized oil flows into the ports of the valve lifters 44 to unlatch the locking pins, thereby switching the valve lifters 44 from the normal operating mode to the telescoping mode.

In the normal operating mode, the valve lifters 44 are locked in an extended state. Therefore, the valve lifters 44 are coupled to the camshafts 30 and 32 to open and close the intake and exhaust valves 20 and 22. In the telescoping mode, the locking pins are unlatched and the valve lifters 44 are collapsed. Therefore, the valve lifters 44 are decoupled from the camshafts 30 and 32.

A position sensor 50 and a pressure sensor 52 are mounted at each intake and exhaust cam phasers 34 and 36. The position sensors 50 measure a rotational position of the cam phasers 34 and 36 and generate a cam phaser position signal indicative of the rotational position of the cam phasers 34 and 36. The pressure sensors 52 measure the oil pressure in the intake and exhaust cam phasers 34 and 36. An engine speed sensor 54 is provided at the engine 12 and measures an engine speed. Other sensors 56 (including but not limited to, oxygen sensors, engine coolant temperature sensors, and/or mass airflow sensors) may be provided at the engine 12 to monitor the engine operating conditions.

When the solenoids 46 are in a de-activated state, the cylinders 14 are supplied with air, fuel and spark, and the engine 12 is in a fully displaced operating mode. When a control module 60 determines that the engine 12 may enter a partially displaced configuration, cylinder deactivation is initiated. The control module 60 then electrically activates the solenoids 46 to switch the valve lifters 44 associated with the cylinders 14 to be deactivated to a telescoping mode. Therefore, the valve lifters 44 do not lift the intake and exhaust valves 20 and 22.

The control module 60 may include a processor and memory such as random access memory (RAM), read-only memory (ROM), and/or other suitable electronic storage. The control module 60 includes a solenoid diagnostic system 62 that diagnoses the solenoids 46.

Figure 2:
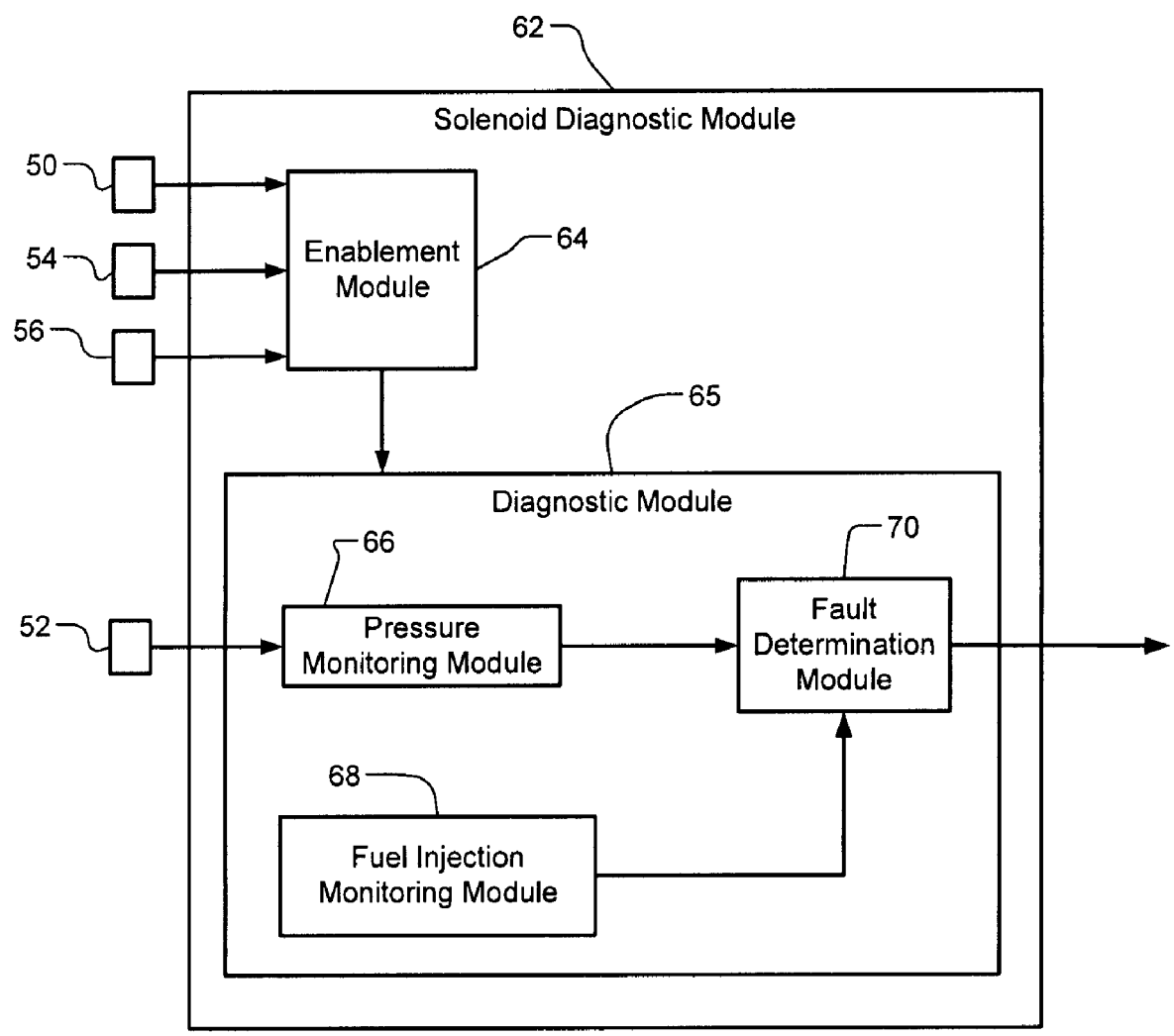
FIG. 2 is a schematic diagram of a solenoid diagnostic system according to the teachings of the present disclosure.

Referring to FIG. 2, the solenoid diagnostic system 62 includes an enablement module 64 and a diagnostic module 65. The diagnostic module 65 includes a pressure monitoring module 66, a fuel injection monitoring module 68, and a fault determination module 70.

The enablement module 64 communicates with the cam phaser position sensor 50, the engine speed sensor 54, and other sensors 56 and determines whether to enable the diagnostic module 65 by verifying whether enablement conditions are met. The enablement conditions may be present, for example only, when the engine speed is below a threshold (e.g. 2000 RPM) and when the intake and exhaust cam phasers 34 and 36 operate in a steady-state. In other words, the enablement module 64 verifies that the engine 12 is operating in a "normal" or low lift state. Those skilled in the art will appreciate that various other enablement conditions are contemplated. The enablement module 64 may be set to determine the enablement conditions at a regular interval, for example only, every 8 seconds.

When the enablement conditions are present, the enablement module 64 activates the diagnostic module 65. The pressure monitoring module 66 records the oil pressures in the intake and exhaust cam phasers 34 and 36.

Under normal operating conditions, when a specific cylinder 14 is deactivated and the corresponding valves 20 and 22 are closed, the pressure monitoring module 66 records a fixed pressure at the intake and exhaust cam phasers 34 and 36. The fixed pressure is a result of friction between the intake and exhaust camshafts 34 and 36 and the valve lifters 44 as the intake and exhaust camshafts 34 and 36 rotate. When a specific cylinder 14 is activated, the pressure sensors 52 measure increased dynamic oil pressure in the intake and exhaust cam phasers 34 and 36. The increase pressure reflects the force required to open the intake and exhaust valves 20 and 22. Therefore, the oil pressure in the intake and exhaust cam phasers 34 and 36 provides an indication of the status of the intake and exhaust valves 20 and 22.

In addition, the oil pressure may be used to determine timing of the intake and exhaust valves events relative to the crankshaft and algorithmically determine whether all of the intake and valves 20 and 22 for the specific cylinders to be deactivated are functioning as commanded.

To diagnose a solenoid 46 for a specific cylinder 14, the pressure monitoring module 66 determines a first pressure at the intake cam phaser 34 based on signals from the pressure sensor 52 at the intake cam phaser 34 associated with the cylinder 14 being monitored. The first pressure may be an average of pressure values measured at the intake cam phaser 34 over a predetermined number of engine revolutions (for example only, 8 revolutions) associated with the cylinder 14 being monitored. After determining the first pressure, the pressure monitoring module 66 may send a signal indicative of the first pressure to the fault determination module 70.

The pressure monitoring module 66 may determine a second pressure at the exhaust cam phaser 36 based on signals from the pressure sensor 52 at the exhaust cam phaser 36 associated with the cylinder 14 being monitored. The second pressure may be an average of pressure values measured at the exhaust cam phaser 36 over a predetermined number of engine revolutions (for example only, 8 revolutions). After determining the second pressure, the pressure monitoring module 66 sends a signal indicative of the second pressure to the fault determination module 70.

The fuel injection monitoring module 68 monitors the fuel injection status of the fuel injectors. A software flag in the control code of the control module may identify whether fuel is injected into the specific cylinder being monitored. When the fuel injection monitoring module 68 determines that the fuel is injected, the fuel injection monitoring module 68 sends a signal to the fault determination module 70 for further diagnosis.

The fault determination module 70 diagnoses the solenoid 46 associated with the specific cylinder 14 based on the first pressure, the second pressure, and the fuel injection status. The fault determination module 70 diagnoses a fault in the solenoid 46 when the first pressure is below a first threshold, when the second pressure is below a second threshold, and when fuel is injected into the specific cylinder 14. The first threshold may be determined based on the pressure in the intake cam phaser 34 when the intake valve 20 is opened. The second threshold may be determined based on the pressure in the exhaust cam phaser 36 when the exhaust valve 22 is opened. Depending on engine configurations, the first threshold may be equal to or different from the second threshold based on the lift profile.

An active status of fuel injection indicates that the cylinder 14 is activated. The first pressure and the second pressure below their respective thresholds indicate that the intake and exhaust valves 20 and 22 are closed and, consequently, the corresponding valve lifters 44 are in a telescoping mode. Based on the fuel injection status and the first and second pressure, the fault determination module 70 determines that the cylinder 14 is activated, but the solenoid 46 for the valve lifters 44 are erroneously activated to switch the valve lifters 44 to a telescoping mode. Therefore, the fault determination module 70 determines that the solenoid 44 associated with the cylinder 14 is faulty.

Upon diagnosing a fault, the fault determination module 70 sends a signal to the control module 60 to take remedial actions, including, but not limited to, disabling fuel to the specific cylinder 14 to prevent further damage to the engine 12.

Figure 3:
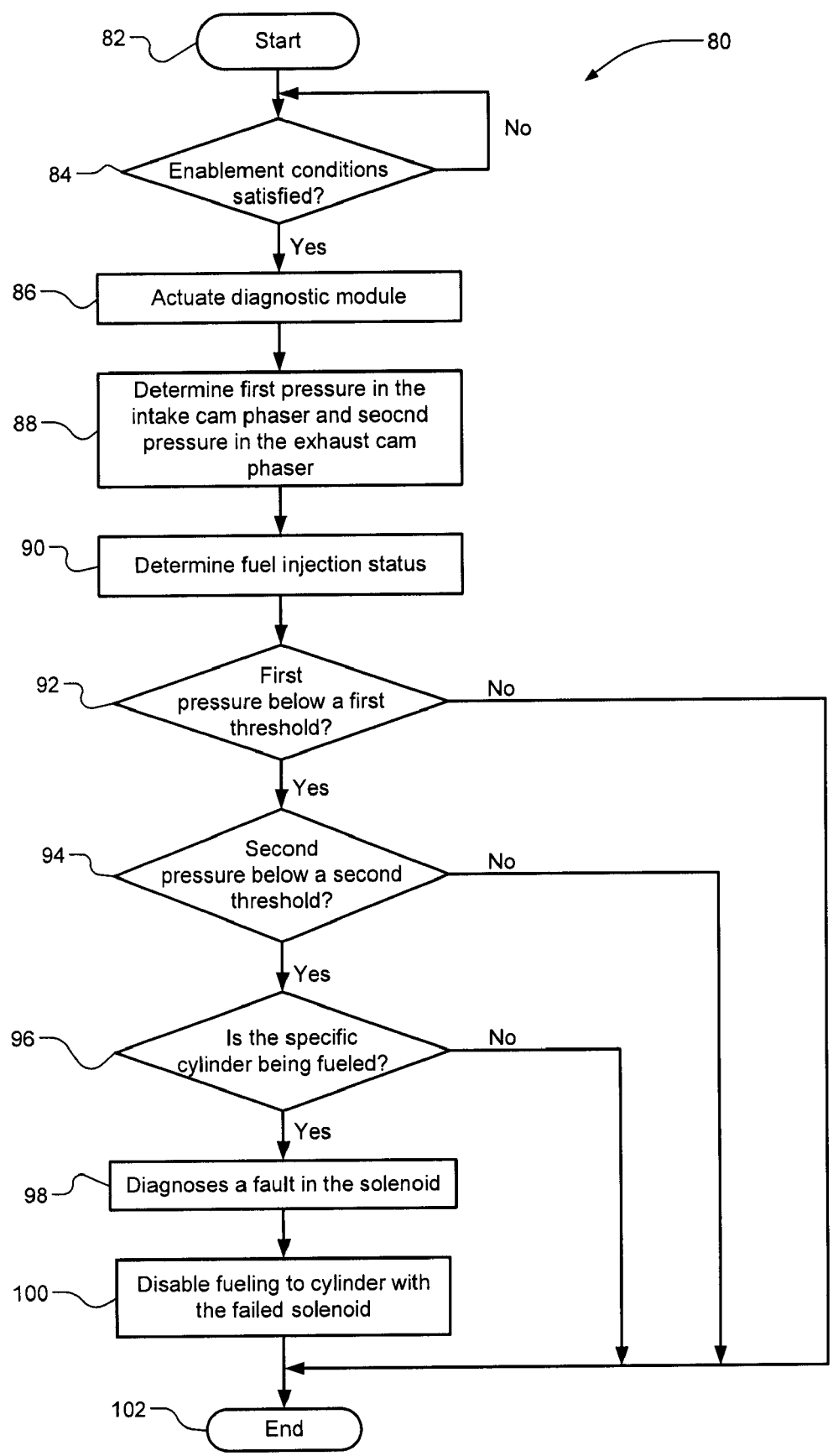
FIG. 3 is a flow diagram of a method of diagnosing a solenoid for cylinder deactivation control according to the teachings of the present disclosure.

Referring to FIG. 3, a method 80 of diagnosing a solenoid 46 for cylinder deactivation control starts in step 82. The enablement module 64 determines whether enablement conditions are satisfied in step 84. When enablement conditions are satisfied, the enablement module 64 actuates the diagnostic module 65 in step 86. The pressure monitoring module 66 starts to monitor oil pressure in the intake and exhaust cam phasers 34 and 36. The pressure monitoring module 66 determines a first pressure in the intake cam phaser 34 and a second pressure in the exhaust cam phaser 36 in step 88. The first pressure may be an average of pressure values measured in the intake cam phaser 34 over a predetermined number of engine revolutions. The second pressure may be an average of pressure values measured in the exhaust cam phaser 36 over a predetermined number of engine revolutions.

The fuel injection monitoring module 68 determines the fuel injection status for the specific cylinder 14 in step 90. Signals indicative of the first pressure, the second pressure, and the fuel injection status are sent to the fault determination module 70. When the fault determination module 70 determines that the first pressure is below a first threshold in step 92, the fault determination module 70 continues to determine whether the second pressure is below a second threshold in step 94. If either the first pressure or the second pressure is not below the respective threshold, the method ends. When the fault determination module 70 determines that the second pressure is below the second threshold in step 94, the fault determination module 70 continues to determine whether the specific cylinder 14 is being fueled in step 96. When the fault determination module 70 determines that the specific cylinder 14 is being fueled in step 96, the fault determination module 70 diagnoses a fault in the solenoid 46 in step 98. The fault determination module 70 then sends to a signal to the control module 60 to disable fueling to the cylinder 14 associated with the failed solenoid 46 in step 100. The method 80 ends in step 102.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A solenoid diagnostic system comprising:
   a pressure monitoring module that determines a first pressure in an intake cam phaser for an intake camshaft and a second pressure in an exhaust cam phaser for an exhaust camshaft associated with a cylinder;
   a fuel injection monitoring module that determines a fuel injection status associated with the cylinder; and
   a fault determination module that diagnoses a fault in a solenoid associated with the cylinder based on the first pressure, the second pressure, and the fuel injection status,
   wherein the fault determination module diagnoses the fault when the first pressure is below a first threshold based on a pressure in the intake cam phaser when an intake valve is opened and the second pressure is below a second threshold based on a pressure in the exhaust cam phaser when an exhaust valve is opened, and wherein diagnosis occurs in response to timing of a fuel injection event.

2. The solenoid diagnostic system of claim 1 wherein the first threshold is equal to the second threshold.

3. The solenoid diagnostic system of claim 1 further comprising:
   a diagnostic module that includes the pressure monitoring module, the fuel injection monitoring module, and the fault determination module; and
   an enablement module that enables the diagnostic module when an enablement condition is met.

4. The solenoid diagnostic system of claim 3 wherein the enablement condition is met when the engine runs at a speed below a predetermined speed and the intake and exhaust cam phasers are active and in a steady state.

5. The solenoid diagnostic system of claim 4 wherein the predetermined speed is 2000 RPM.

6. A solenoid diagnostic system comprising:
   a pressure monitoring module that determines a first pressure in an intake cam phaser for an intake camshaft and a second pressure in an exhaust cam phaser for an exhaust camshaft associated with a cylinder;
   a fuel injection monitoring module that determines a fuel injection status associated with the cylinder; and
   a fault determination module that diagnoses a fault in a solenoid associated with the cylinder based on the first pressure, the second pressure, and the fuel injection status, wherein the first pressure is based on an average of pressure values in the intake cam phaser over N engine revolutions, where N is an integer greater than one.

7. The solenoid diagnostic system of claim 6 wherein the predetermined number is 8.

8. The solenoid diagnostic system of claim 6 wherein the second pressure is based on an average of pressure values in the exhaust cam phaser over M engine revolutions, where M is an integer greater than one.

9. The solenoid diagnostic system of claim 6 wherein the fault determination module diagnoses the fault when the first pressure is below a first threshold based on a pressure in the intake cam phaser when an intake valve is opened and the second pressure is below a second threshold based on a pressure in the exhaust cam phaser when an exhaust valve is opened, and wherein diagnosis occurs in response to timing of a fuel injection event.

10. A solenoid diagnostic system comprising:
    a pressure monitoring module that determines a first pressure in an intake cam phaser for an intake camshaft and a second pressure in an exhaust cam phaser for an exhaust camshaft associated with a cylinder;
    a fuel injection monitoring module that determines a fuel injection status associated with the cylinder; and
    a fault determination module that diagnoses a fault in a solenoid associated with the cylinder based on the first pressure, the second pressure, and the fuel injection status, wherein the second pressure is based on an average of pressure values in the exhaust cam phaser over N engine revolutions, where N is an integer greater than one.

11. The solenoid diagnostic system of claim 10 wherein the first pressure is based on an average of pressure values in the intake cam phaser over M engine revolutions, where M is an integer greater than one.

12. The solenoid diagnostic system of claim 10 wherein the fault determination module diagnoses the fault when the first pressure is below a first threshold based on a pressure in the intake cam phaser when an intake valve is opened and the second pressure is below a second threshold based on a pressure in the exhaust cam phaser when an exhaust valve is opened, and wherein diagnosis occurs in response to timing of a fuel injection event.

13. A method of diagnosing a solenoid associated with a cylinder for cylinder deactivation control comprising:
    determining a first pressure in an intake cam phaser for an intake camshaft associated with the cylinder;
    determining a second pressure in an exhaust cam phaser for an exhaust camshaft associated with the cylinder;
    determining a fuel injection status of the cylinder associated with the cylinder; and
    diagnosing a fault in the solenoid when the first pressure is below a first threshold based on a pressure in the intake cam phaser when an intake valve is opened and the second pressure is below a second threshold based on a pressure in the exhaust cam phaser when an exhaust valve is opened, wherein the diagnosing occurs in response to timing of a fuel injection event.

14. The method of claim 13 further comprising determining an enablement condition to diagnose the solenoid.

15. The method of claim 14 wherein the enable condition is met when the engine runs at a speed below a predetermined speed and the intake and exhaust cam phasers are active and in a steady state.

16. The method of claim 15 wherein the predetermined speed is 2000 RPM.

17. A method of diagnosing a solenoid associated with a cylinder for cylinder deactivation control comprising:
    determining a first pressure in an intake cam phaser for an intake camshaft associated with the cylinder;
    determining a second pressure in an exhaust cam phaser for an exhaust camshaft associated with the cylinder;
    determining a fuel injection status of the cylinder associated with the cylinder;
    diagnosing a fault in the solenoid based on the first pressure, the second pressure, and the fuel injection status; and
    averaging pressure values in the intake cam phaser over N engine revolutions associated with the cylinder to determine the first pressure, where N is an integer greater than one.

18. The method of claim 17 further comprising averaging pressure values in the exhaust cam phaser over M engine revolutions associated with the cylinder to determine the second pressure, where M is an integer greater than one.

19. The method of claim 17 further comprising diagnosing the fault when the first pressure is below a first threshold based on a pressure in the intake cam phaser when an intake valve is opened and the second pressure is below a second threshold based on a pressure in the exhaust cam phaser when an exhaust valve is opened, and wherein diagnosis occurs in response to timing of a fuel injection event.

20. A method of diagnosing a solenoid associated with a cylinder for cylinder deactivation control comprising:
    determining a first pressure in an intake cam phaser for an intake camshaft associated with the cylinder;
    determining a second pressure in an exhaust cam phaser for an exhaust camshaft associated with the cylinder;
    determining a fuel injection status of the cylinder associated with the cylinder;
    diagnosing a fault in the solenoid based on the first pressure, the second pressure, and the fuel injection status; and
    averaging pressure values in the exhaust cam phaser over N engine revolutions associated with the cylinder to determine the second pressure, where N is an integer greater than one.

21. The method of claim 20 further comprising averaging pressure values in the intake cam phaser over M engine revolutions associated with the cylinder to determine the first pressure, where M is an integer greater than one.

22. The method of claim 20 further comprising diagnosing the fault when the first pressure is below a first threshold based on a pressure in the intake cam phaser when an intake valve is opened and the second pressure is below a second threshold based on a pressure in the exhaust cam phaser when an exhaust valve is opened, and wherein diagnosis occurs in response to timing of a fuel injection event.

* * * * *